Jan. 19, 1971  J. A. MARCUS  3,555,907
CLINICAL THERMOMETER ROTARY SHAKEDOWN DEVICE
Filed March 25, 1969
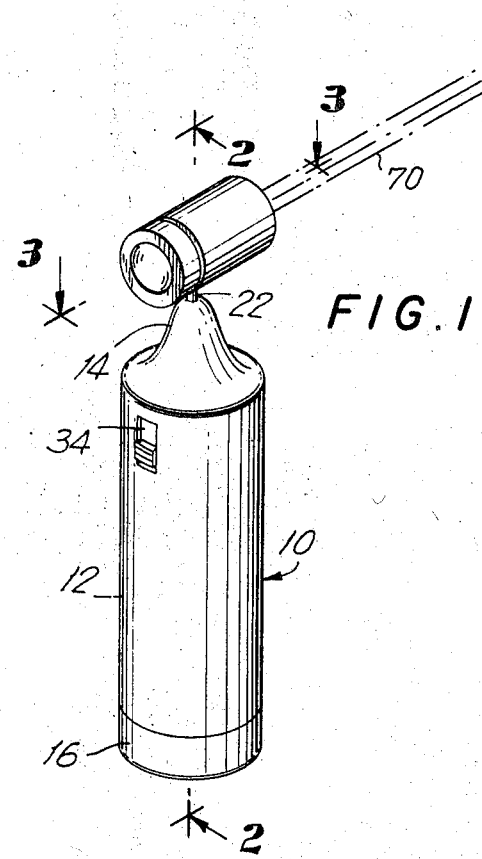
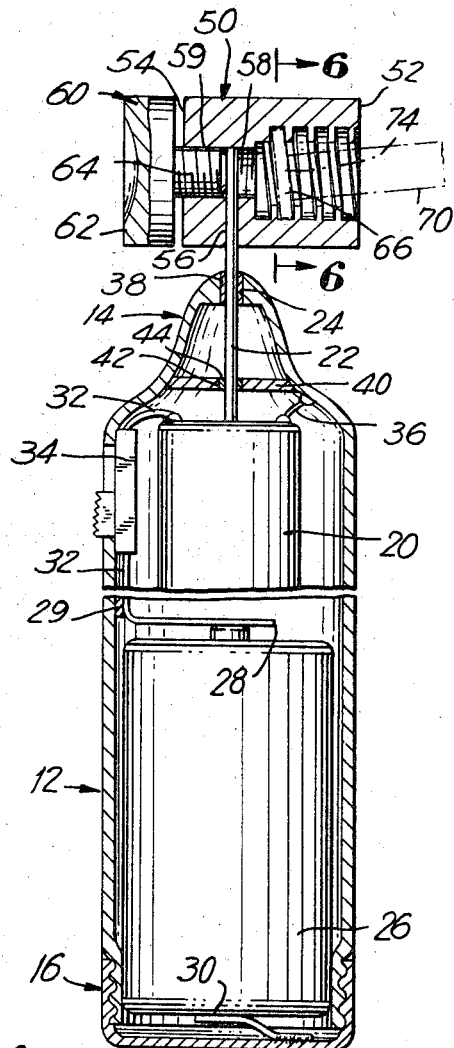
INVENTOR.
JOEL A. MARCUS
BY
Kirschstein, Kirschstein, Ottinger & Frank
ATTORNEYS United States Patent Office 3,555,907
Patented Jan. 19, 1971

3,555,907
CLINICAL THERMOMETER ROTARY SHAKEDOWN DEVICE
Joel A. Marcus, 68—61 Yellowstone Blvd., Forest Hills, N.Y. 11375
Filed Mar. 25, 1969, Ser. No. 810,239
Int. Cl. G01k 5/06
U.S. Cl. 73—373                                11 Claims

ABSTRACT OF THE DISCLOSURE

A threaded bore in a sleeve can be selectively engaged by the projecting apices of a triangular transversely disposed thin substantially flat head on the back of a standard clinical thermometer. The sleeve is rotatably driven about an axis perpendicular to the length of the bore by a motor mounted in a housing which includes a suitable energy source and a control (off-on) switch. A counterbalance weight on the sleeve opposite the threaded bore stabilizes the spinning sleeve and thermometer to avoid excessive wobbling and vibration. As the thermometer spins, the level of mercury thread therein is lowered, the mercury being forced by centrifugal action through the maximum temperature recording trap into the bulb at the head of the thermometer.

BACKGROUND OF THE INVENTION (1) Field of the invention

Devices for shaking down mercury clinical thermometers.

(2) Description of the prior art

A clinical thermometer conventionally includes a bulb at its head and a capillary bore running from the bulb up the shank of the thermometer. A short distance above the bulb the bore is formed with a maximum temperature recording trap which may be a constriction. Mercury fills the bulb and extends into the bore. The trap prevents mercury, which has risen from the bulb into the bore as the bulb is heated, from returning into the bulb when the bulb cools. Thus the trap maintains the mercury thread in the bore at its highest level to hold the maximum temperature reading. When the thermometer is to be used again, the level of mercury in the bore must be lowered so that a new setting will be obtained which is less than any reading which may have to be taken.

To reduce the level of mercury in the bore, the common practice is to manually grasp the back of the thermometer and shake the thermometer in such a fashion as to swing it sharply about the hand-held portion. The centrifugal force created by the swinging urges the mercury in a direction downwardly past the trap into the bulb. The shaking is continued until the mercury column in the bore stands at a level well below a person's normal temperature, e.g., 94° F. or lower.

Many devices have been heretofore known for the purpose of mechanically facilitating this shaking operation. Most of the prior devices were manually powered and included tubular thermometer cases having a closure cap into which the thermometer was inserted bulb first. The cap would then be attached to the case and the case rapidly spun by a string or strings attached to the cap. This prior device was deficient because it required a plurality of operations including the removal of the cap, insertion of the thermometer, subsequent replacement of the cap, spinning of the thermometer involving manual force, subsequent removal of the cap and removal of the thermometer.

When considering the time occupied in performing these steps, it is easy to see why such devices were not widely used, especially in hospitals where nurses are on a tight time schedule. A nurse found it much quicker and simpler to merely grasp the end of the thermometer and shake it to reduce the mercury level in the bore.

Other known devices included removable extensions to be added to the end of the thermometer. These extensions would increase the distance between the mercury column and the arm which shook the thermometer. They acted as a force multiplier to increase the centrifugal force and reduce the time or the number of shakes required to lower the level of the column of mercury.

These devices also did not gain widespread acceptance because they, too, entailed a plurality of operations and still needed manual shaking. Additionally, although they increased the centrifugal force acting on the mercury column they required additional energy and work by the person shaking the thermometer as now both the thermometer and attachment had to be shaken.

Also known before have been elaborate centrifuge devices which contained a plurality of thermometers in various compartments. The thermometers would be placed in the compartments and the devices rapidly spun. Unfortunately, the centrifuge devices were found to be impractical because they were large machines which could only be efficiently used with many thermometers, and, under present practice, it has been found that the intermixing of patients' thermometers was not wise because the possibility of cross-infection was increased. Thus, in present hospital routine, a patient usually is assigned a single thermometer which is to be used only by him throughout his stay, and, often, it is his to take home. The hospital does not, therefore, collect a plurality of thermometers which have been used and upon which temperatures are recorded and then simultaneously reduce the mercury columns in all of the thermometers in a common centrifuge.

Additionally, prior centrifuge devices such as the one shown in U.S. Pat. 2,110,308 called for the insertion of each individual thermometer into a housing which maintained the thermometer in a certain proper position while the entire housing was spun about in a centrifuge. Because the thermometers were or could be inserted into the housing bulb end first and because a portion of the housing grasped the thermometer shank at a point adjacent the midsection thereof, the danger of cross-infection between successive thermometers handled was increased.

When a thermometer is in use in either rectal or oral application, the thermometer often is inserted into a body cavity to a point adjacent the midsection of the thermometer. Even with the use of thermometer sterilizing solutions, there remains a possibility that cross-infection will occur with the use of any mechanical shaking device that grasps the thermometer shaft near its middle. This is true especially when a thermometer is merely dipped into a sterilizing bath and not entirely immersed in the bath so that portions adjacent the rear end are not sterilized.

SUMMARY OF THE INVENTION

It is an object of the present invention to provide a device of the foregoing general character for reducing the level of a column of mercury in a thermometer which device, however, is so constructed that it is not subject to any of the foregoing disadvantages.

More specifically it is an object of the invention to provide a thermometer rotary shakedown device of the character described which is simple and rugged in construction, easy to operate, and yet can be fabricated by mass production methods.

It is another object of the invention to provide a thermometer rotary shakedown device of the character described wherein the thermometer is grasped only at the back end and spun without the use of manual force.

It is yet another object of the present invention to provide a thermometer rotary shakedown of the foregoing general character which is especially adapted for the use of nurses in a hospital, is power operated, portable and, additionally, light in weight.

It is still a further object of the present invention to provide a device of the general character described in which a counterbalance is provided to enable the rapid rotation of a single thermometer at a time without excessive wobbling.

It is yet a further object of the present invention to provide a device of the character described which is adapted to threadedly engage the back end of a standard clinical thermometer thereof without the necessity of additional attachments on said thermometer.

It is a further object of the present invention to provide a device of the character described which is adapted to individually rotate clinical thermometers while minimizing any danger of cross-infection between thermometers used by different patients.

Other objects of the invention in part will be obvious and in part will be pointed hereinafter.

The invention accordingly consists in the features of construction, combinations of elements and arrangement of parts which will be exemplified in the thermometer rotary shakedown device hereinafter described and of which the scope application will be indicated in the appended claims.

BRIEF DESCRIPTION OF THE DRAWINGS

In the accompanying drawings in which is shown one of the various possible embodiments of the invention:

FIG. 1 is an isometric view of a clinical thermometer rotary shakedown device constructed in accordance with and embodying the present invention and showing, in dashed lines, a thermometer mounted therein;

FIG. 2 is an enlarged cross-sectional view through said device, the same being taken substantially along the line 2—2 of FIG. 1 and showing the thermometer in dashed lines;

FIG. 3 is an enlarged sectional view through the sleeve of the device taken substantially along the line 3—3 of FIG. 1 and showing the thermometer in dashed lines;

FIG. 4 is a view of a standard clinical thermometer suitable for use with the new shakedown device.

FIG. 5 is an end view of the thermometer shown in FIG. 4 and illustrating the triangular head at the back end of the thermometer; and FIG. 6 is a sectional view through the sleeve of the device, the same being taken substantially along the line 6—6 of FIG. 2 and showing the thermometer in dashed lines.

DESCRIPTION OF THE PREFERRED EMBODIMENT

The clinical thermometer rotary shakedown device of the present invention includes a body which houses a battery power supply and a small electric motor. The output shaft of the motor projects upwardly from the body to engage a sleeve, the longitudinal axis of which is perpendicular to the shaft. A threaded bore extends into one end of the sleeve in a direction perpendicular to the output shaft. Into this threaded bore the triangular head at the back end of a clinical thermometer is inserted and threaded until this end of said thermometer is tightly engaged. A tapped well is located on an axis coincident with that of the threaded bore and extends into the opposite end of the sleeve. Into this well a counterweight screw is inserted. The tip of the counterweight screw abuts the output shaft of the motor, acting as a set screw to retain the shaft in the sleeve. The center of gravity of the counterweight screw is radially spaced from the output shaft a distance which is sufficient to dynamically counterbalance the sleeve and a thermometer which is inserted into the sleeve, so that the sleeve, the thermometer and the counterweight will spin without excessive imbalance.

Referring now in detail to the drawings, the reference numeral 10 denotes the clinical thermometer rotary shakedown device constructed in accordance with and embodying the instant invention. Included in the device is a hollow cylindrical casing 12 having an arcuately curved upwardly tapering unitary dome 14 and a bottom closure 16 threadedly engaging the casing.

Mounted within the cylindrical casing at the upper end thereof is a small electric motor 20 having an output shaft 22. The shaft 22 projects upwardly through a central opening 24 in the dome 14 and serves to rotate and mount the sleeve of the device which is designed to engage a thermometer.

Positioned within the base below the motor is a dry battery 26. A suitable electrical circuit is provided so that the battery may power the motor. The circuit includes two leaf spring contacts 28 and 30 which abut the battery output terminals. The lower spring contact 30 is electrically joined to the bottom closure 16 and biases the battery against the upper contact 28.

At the upper contact 28 an insulated mounting 29 holds the contact spaced from the wall of the casing. An electrical lead 32 is positioned between the contact 28 and one electrical terminal of the motor. Selectively interrupting the electrical connection within this lead is a suitable switch 34 which, in the embodiment illustrated, is a slide switch. A lead 36 connects the other terminal of the motor to the casing 12. The casing and the bottom closure are made of an electrically conductive metal so that electric current can flow from the contact 30 to the lead 36.

Of course, the electrical circuit shown in the illustration of FIG. 2 and described above can be modified as desired if a nonconductive plastic casing and bottom closure are to be used. Such modification would include an electrical lead running from the contact 30 to the other motor terminal.

Through the electrical circuit described, the motor 20 may be selectively controlled to rotate the output shaft 22 and the sleeve attached thereto. In order to provide a stable bearing surface for the output shaft and preclude undue wear of the motor, the dome 14 of the casing is thickened around the opening 24 and a suitable bearing 38, made of nylon for instance, is press fitted or forced into the opening. The output shaft is journalled for rotation in the bearing 38.

A web 40 is additionally provided below the bearing 38. This web is secured around its periphery to the casing. A central opening 42 is formed in the web. The opening 24 and 42 lie on a common vertical axis, the same being the axis of rotation of the output shaft 22. In the opening 42, a bearing 44 is forced. The bearing 44 is of conventional construction and may also be of nylon. The output shaft is also journalled for rotation within the bearing 44. As the output shaft rotates, the bearings 38 and 44 stabilize the output shaft against lateral deflections.

As previously mentioned, a sleeve 50 is mounted on the portion of the output shaft 22 projecting above the dome 14. The sleeve 50 is preferably cylindrically shaped and includes a front end 52 and a rear end 54. A lateral smooth-walled straight cylindrical opening 56 projects radially downwardly from the longitudinal axis of the sleeve. The smooth-walled opening 56 is offset longitudinally rearwardly from the center of the length of the sleeve. The sleeve is mounted on the output shaft with the motor shaft projecting into this opening 56.

A straight passageway 58 runs along the longitudinal axis of the sleeve between the spaced ends 52 and 54. A well portion 59 of the passageway 58 running inwardly from the end 54 is V-threaded and of constant diameter up to a point beyond the intersection of the smooth cylindrical opening 56 and the passageway 58. The output shaft 22 projects into the passageway 58 with the end of the shaft resting on the upper surface of the passageway. To fix the output shaft within the head, a counterbalance screw 60 is provided. Included with the counterbalance screw is an enlarged head 62 and a threaded shank 64. The shank 64 is screwed into the well 59 from the end 54 until the tip of the shank presses the portion of the output shaft projecting into the passageway, thereby functioning as a set screw. To facilitate tightening of the counterbalance screw, the head 62 may be provided with external ribbing.

The passageway 58 is of an enlarged diameter from the inner end of the threaded well 59 to the front end 52, thereby forming an enlarged bore 66 that extends to said end 52. The walls of the enlarged bore 66 are tapped in the form of a female rectangular thread, the major (outer) diameter of which will accommodate the back end of a thermometer inserted and threaded therein.

Attention is now directed to a standard clinical thermometer 70 which is to be inserted into the threaded bore 66 so that it may be subsequently rotated to lower the mercury column thereof. The thermometer 70 (illustrated in the dashed lines in FIGS. 1–3) includes a thin-walled glass bulb 72 at one end of a glass shank 71. An enlarged glass head 74 at the other end of the shank is typical of clinical thermometers and, as illustrated in FIG. 5, is essentially flat (its outer exposed broad surface sometimes is somewhat convex). The head is basically triangular when viewed from the end (see FIG. 5) and includes three apices 76 which lie on a circle that is substantially concentric with the longitudinal axis of the shank. The enlarged head 74 is of a thickness slightly less than the breadth of a single groove in the female rectangular thread of the bore 66. As best seen in FIG. 4, the plane of the enlarged head 74 is perpendicular to the length of the shank and the three apices 76 are in this plane. The thread of the bore 66 is preferably square to facilitate engagement between the triangular apices 76 of the enlarged head 74 and the major thread diameter. The enlarged head of the thermometer may be engaged within the thread of the bore 66 and rotated so that the enlarged head with its triangular apices advance within the threaded bore 66. To enable this operation to be effected the circle defined by the apices 76 has a diameter greater than that of the minor (inner) diameter of the bore and less, preferably only slightly, than that of the major diameter of the bore; moreover, the apices project radially beyond the shank and the major transverse dimension of the shank is less than the minor diameter of the bore.

As the thread within the tapped bore 66 is pitched, and as the triangular apices are coplanar, with, all points along the major thread diameter lying along a spirial, said apices will, after a few turns of the head, jam in a locked position in the bore. In this locked position the thermometer will be slightly askew from the longitudinal axis of the cylindrical sleeve 50.

In order to prevent breakage of the glass thermometer as the enlarged end is engaged and forced within the threaded bore 66, the cylindrical sleeve 50 is constructed of a yieldable elastomeric material such as a synthetic plastic, e.g., polyvinyl chloride, polypropylene, polyethylene, butadiene modified polystyrene, natural or artificial rubber or tetrafluoroethylene so that the thread will flex somewhat and will tightly engage the enlarged head without fracturing the glass thermometer.

With the enlarged head of the thermometer jammed in locked position within the threaded bore 66 and with the counterbalance screw 60 positioned with its shank 64 in engagement with the threaded well 59 and abutting the output shaft 22, the cylindrical sleeve 50 will be approximately dynamically balanced. That is, the centers of gravity on the longitudinal axis of the sleeve at both sides of the output shaft 22 will be in spinning balance when the output shaft 22 rotates.

The thermometer rotary shakedown device is particularly useful for nurses when making the rounds in a hospital and taking the temperature of each patient, although it is well adapted for use in the home of a patient recuperating or invalid.

In use, the counterbalance screw 60 is forced through the well 59 and locks in contact against the output shaft 22. The nurse will carry the device with her as she is making the rounds. As she comes to each patient, she will twist the enlarged head of the thermometer into the threaded bore 66 until it jams in a locked position and, subsequently, she will turn the switch 34 to the "on" position which completes the circuit operating the motor. The motor will rapidly spin the output shaft 22 which spins the cylindrical sleeve 50, the thermometer 70 and the counterbalance screw 60. After a few seconds the switch is turned "off" and the thermometer, with the mercury column lowered, is withdrawn from the bore by untwisting. This operation takes but a few moments and saves a great deal of energy and fatigue brought about by repeated shaking of thermometers.

It may also be noted that as only the enlarged head of the thermometer engages the cylindrical sleeve 50, the possibility of cross-infection between the thermometers of successive patients is minimized.

Additionally, it should be observed that as the thermometer is gripped from the enlarged head only and as the thermometer is spun about from a center which is spaced behind the enlarged head, the centrifugal force may only move the column of mercury downwardly toward the bulb. Thus there is no change of forcing the mercury to the back end of the thermometer.

It thus will be seen that there has been provided a device which achieves the various objects of the invention and which is well adapted to meet the conditions of practical use.

As various possible embodiments might be made of the above invention and as various changes might be made in the embodiment set forth, it is to be understood that all matter herein described or shown in the accompanying drawings is to be interpreted as illustrative and not in a limiting sense.

Having thus described the invention, there is claimed as new and desired to be secured by Letters Patent:

1. In combination, a clinical thermometer having an enlarged flat polygonal head with projecting apices, said thermometer having a column of mercury therein, and a thermometer rotary shakedown device for lowering said column of mercury, said device comprising a hollow casing, motive means within said casing, said motive means selectively producing a rotational output, a rotatable sleeve, coupling means between said sleeve and said motive means, said coupling means transmitting rotational motion from said motive means to said sleeve to spin the sleeve about an axis transverse to the longitudinal axis of the sleeve, means forming a threaded bore within said sleeve, said threaded bore having a major thread diameter of a size to threadedly receive the enlarged head of said thermometer for a few turns of said head up to a point where said head will jam in the bore and be locked therein, whereby with the thermometer head locked in the bore the thermometer may be rapidly rotated by said motive means with the resulting centrifugal force lowering the level of the column of mercury within the thermometer to thereby reduce the temperature reading of the thermometer.

2. A combination in accordance with claim 1 wherein a dry battery is positioned within said hollow casing, said battery being in selectively operable electric communication with said motive means to power the same.

3. A combination in accordance with claim 1 wherein the sleeve is constructed of a yieldable elastomeric material, the threads of the threaded opening flexing as the enlarged head of the thermometer is twisted therein whereby the end of the thermometer is locked in engagement with the threads before the glass of which the thermometer is constructed may fracture.

4. A combination in accordance with claim 3 wherein the thread in the bore is a rectangular thread.

5. A combination in accordance with claim 3 wherein the major diameter of the threaded bore is larger than the diameter of the circle defined by the apices of the enlarged head of the thermometer, the minor diameter of said bore is less than said diameter of the circle, the width of the groove of the thread in the bore is not less than the thickness of the enlarged head and the minor diameter of the bore exceeds the major transverse dimension of the shank of the thermometer.

6. A combination in accordance with claim 1 wherein the coupling means between the motive means and the sleeve includes an output shaft, and means to lock the output shaft to the sleeve so that rotation of the output shaft directly rotates the sleeve.

7. A combinaion in accordance with claim 6 wherein an opening in the casing is provided, the output shaft projecting through said opening, said device further including means forming a first bearing surface between said opening and said output shaft to minimize lateral displacement of said shaft when said motive means rotates the shaft, said output shaft being journalled for rotation within said first bearing surfaces.

8. A combination in accordance with claim 7 wherein a second bearing surface is provided within the hollow casing, said second bearing surface being in alignment with the first bearing surface and the axis of said output shaft, said second bearing surface being positioned below the first bearing surface, said second bearing surface being adjacent said motive means, said second bearing surface surrounding said output shaft, said output shaft being rotatable within said second bearing surface, and means connecting said second bearing surface to the casing and rigidly supporting said second bearing surface.

9. A combination in accordance with claim 1 wherein the sleeve includes a counterbalance weight positioned in alignment with and opposite the threaded bore, said sleeve being substantially in dynamic balance when rotated by said motive means with the enlarged head of a thermometer positioned in said threaded bore, the mass of said counterbalance weight substantially correcting any rotational imbalance caused by the mass of the thermometer.

10. A combination in accordance with claim 9 wherein the counterbalance weight includes a threaded shank portion, the end of said threaded shank portion engaging the coupling means so that the coupling means directly rotates the sleeve when the motive means is actuated.

11. A thermometer rotary shakedown device for lowering the column of mercury in a clinical thermometer, said device comprising a hollow casing, motive means within said casing, said motive means having a rotatable output shaft, a member having a bore into which said shaft extends, means operationally unitary with said member and extending radially of said bore for detachably engaging the end of a clinical thermometer opposite the bulb thereof, said member having a tapped opening extending radially of said bore in line with a thermometer engaged by said last-named means, a counterbalance weight, said counterbalance weight engaging said opening, the member, the thermometer and the weight being substantially in dynamic balance when rotated by said motive means, the mass of the counterbalance weight substantially correcting any rotational imbalance caused by the mass of the thermometer, the counterbalance weight including a male threaded shank portion screwed into the tapped opening, the end of said threaded shank portion engaging the shaft so that the shaft directly rotates the member when the motive means is actuated.

References Cited

UNITED STATES PATENTS

| | | | |
|---|---|---|---|
| 848,458 | 3/1907 | Grafton | 73—373 |
| 1,119,202 | 12/1914 | Talbot | 73—373 |
| 1,417,365 | 5/1922 | Wallendorf | 73—373 |
| 2,047,801 | 7/1936 | Russell | 73—373 |
| 2,685,799 | 10/1954 | Sullivan | 73—373 |
| 3,019,654 | 2/1962 | Spaulding | 73—373 |

LOUIS R. PRINCE, Primary Examiner

W. A. HENRY II, Assistant Examiner